Nov. 19, 1968  K. W. KAMPERT ET AL  3,411,809
ARTICULATED VEHICLE BUSHING
Filed Oct. 27, 1966  2 Sheets-Sheet 1

INVENTORS
KEITH W. KAMPERT
KENNETH E. HOUTZ

Richard E. Backus
ATTY

Nov. 19, 1968     K. W. KAMPERT ET AL     3,411,809
ARTICULATED VEHICLE BUSHING

Filed Oct. 27, 1966     2 Sheets-Sheet 2

INVENTORS
KEITH W. KAMPERT
KENNETH E. HOUTZ

Richard E. Backus
ATTY

United States Patent Office 3,411,809
Patented Nov. 19, 1968

3,411,809
ARTICULATED VEHICLE BUSHING
Keith W. Kampert, Libertyville, and Kenneth E. Houtz, Streamwood, Ill., assignors to International Harvester Company, Chicago, Ill., a corporation of Delaware
Filed Oct. 27, 1966, Ser. No. 590,039
7 Claims. (Cl. 280—400)

ABSTRACT OF THE DISCLOSURE

An articulated connection between front and rear frame sections of an articulated vehicle to provide relative rotation therebetween about an axis of rotation, the connection including a pair of vertically spaced hinges each having unsymmetrically truncated spherical bushing surfaces to provide a selective direction axial load transfer and misalignment compensation and cylindrical bushing surfaces to provide radial load transfer.

---

The present invention relates to articulated material handling vehicles and more specifically to a new and improved articulation connection between the front and rear frame sections of such vehicles.

It is a general object of the present invention to provide an articulated material handling vehicle having an articulation connection between the vehicle sections with improved transmission of lateral and axial thrust loads, automatic compensation for misalignment, and improved wear resistance and reliability.

It is a further object of the invention to provide such an articulated connection which may be incorporated in existing articulated vehicles.

Briefly, the invention preferably includes at least a pair of spaced hinges connecting the front and rear frame sections of an articulated vehicle to provide relative rotation therebetween about an axis of rotation. Each of these hinges preferably includes nonsymmetrically truncated spherical bushing surfaces providing a selective direction axial load connection and misalignment compensation. Each of the hinges also has cylindrical bushing surfaces providing a radial load connection. Improved means for axial rotation between the frame sections over a larger surface area is provided.

Numerous further objects, advantages and features of the invention pertain to the particular arrangements and structures whereby the above and other objects of the invention are attained.

The invention, both as to its structure and mode of operation, will be better understood by reference to the following disclosure and the drawings forming a part thereof wherein:

FIGURE 3 is a plan view of the articulation connection shown in FIGURE 2, half in cross section taken along the line 3—3 of FIGURE 2;

Figure 1:
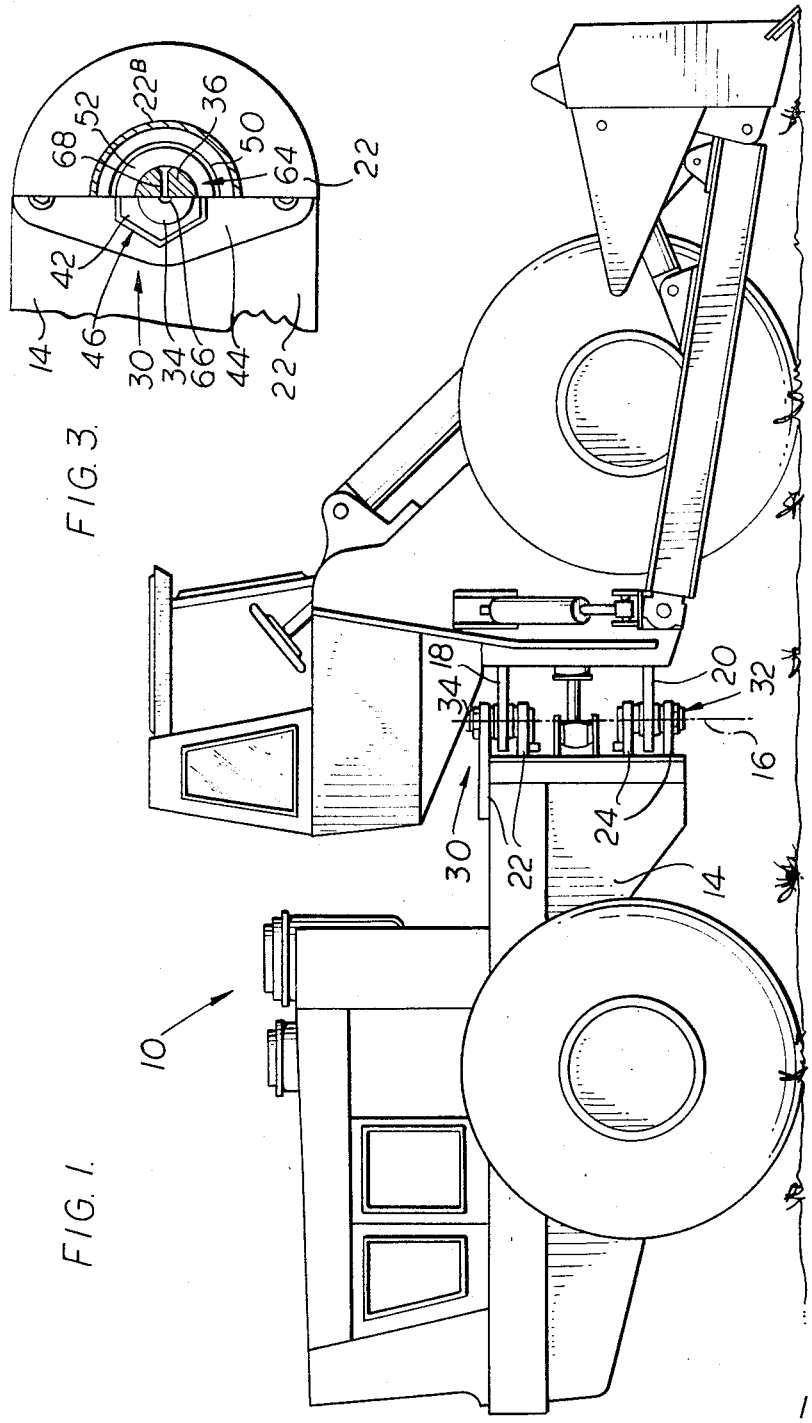
FIGURE 1 is a side view of an exemplary articulated material handling vehicle in accordance with the present invention.

Turning now to the drawings, there is shown in FIGURES 1 through 5 an exemplary articulated material handling vehicle 10 in accordance with the present invention. It may be seen that the vehicle 10 has a front frame section 12 and a rear frame section 14 rotatably connected to provide the desired articulation about a vertical axis of rotation 16. It will be appreciated that the articulated vehicle 10 may be of a generally conventional construction and accordingly need not be described in general herein. The front frame section 12 here conventionally includes vertically spaced projecting upper and lower tongues 18 and 20 respectively mating within correspondingly positioned pairs of ears 22 and 24 projecting from the rear frame section 14. Each pair of ears, mating tongue and the components connecting the tongue to the pair of ears may be considered to define a bearing assembly or top hinge 30 or bottom hinge 32.

The extremely large forces produced in vehicles of this type subject both the top hinge 30 and the bottom hinge 32 to severe loads beyond the capacity of ordinary bearings. Further, the severe loads upon the vehicle 10 and other factors create substantial misalignments which would cause binding constriction in conventional pivotal connectors, i.e. where the tongues are not coplanar with their corresponding ears. In addition to high radial loads at right angles to the axis of rotation 16, the hinges 30 and 32 must transmit severe axial loads. The major axial load encountered by the bottom hinge 32 is a downward force by the pair of ears 24 against the tongue 20. The major axial load encountered by the top hinge 30 is an upward force by the pair of ears 22 against the tongue 18. The hinges 30 and 32 of the invention are specifically adapted to provide preferred direction axial thrust bearing characteristics for these loads as well as to automatically provide adjustment for misalignment.

Figure 2:
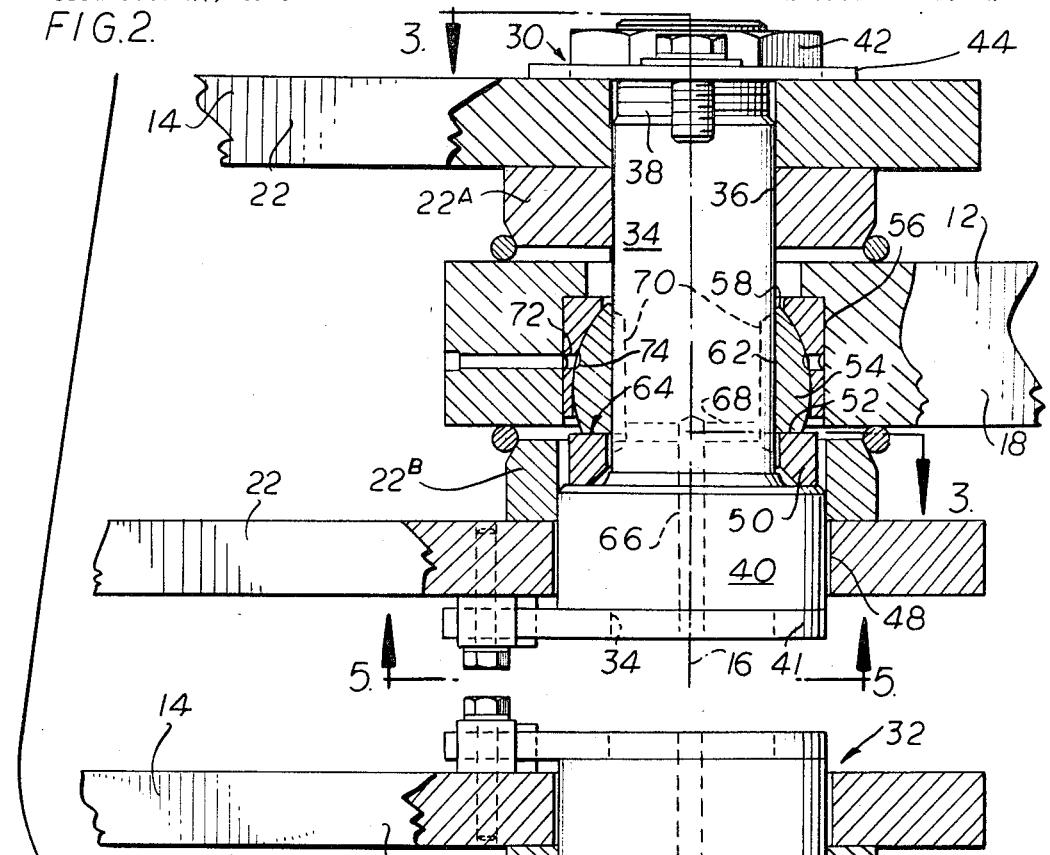
FIGURE 2 is an enlarged side view of the articulation connection between the frame sections of the vehicle of FIGURE 1 in cross section through the axis of rotation between the two frame sections.

Referring particularly to FIGURE 2, it may be seen that the top hinge 30 is preferably identical and coaxial, but in inverse position to, the bottom hinge 32. Accordingly, only the hinge 30 need be described here by way of example, it being understood that the corresponding component positions and forces involved are reversed in the hinge 32.

The hinge 30 includes a large diameter steel pin 34 which extends through the pair of ears 22 and the tongue 18 therebetween. The pin 34 preferably has an elongate central cylindrical shank 36 having a threaded end 38. The opposite end of the pin 34 preferably has a cylindrical head 40 of substantially larger diameter than the shank 36. The pin 34 is preferably restrained from rotational movement with respect to the ears 22 by a pin lockplate 41.

The sole axial retention of the pin 34 with respect to the ears 22 is preferably provided only at the threaded end 38 by nut 42 thereon which abuts the outer surface of the uppermost ear 22a of the pair of ears 22. This nut 42 is prevented from rotating by a retaining plate 44 bolted to the ear 22a. The retaining plate 44 defines an aperture 46 therein surrounding the nut 42. The head 40 of the pin 34 is preferably mounted through a corresponding diameter cylindrical aperture 48 in the lower ear 22b of the pair of ears 22.

Referring again to FIGURE 2, the components of the hinge 30 will be described in regard to the transmission of the axial load therethrough. The hinge 30 is specifically adapted to transmit axial force in one direction only, i.e. an upward force from the pair of ears 22 against the corresponding downward force from the tongue 18. The upward axial force from the pair of ears 22 is transmitted to the pin 34 through the nut 42. From the pin 34 this force is exerted only against an annular collar or ring 50. The collar 50 is preferably formed from aluminium bronze or other suitable high-strength bearing material. It closely surrounds the shank 36 of the pin 34 and abuts the inside surface of the pin head 40, but is not designed to rotate with respect to the pin 34. The collar 50 transmits the upward axial forces exerted on it by the head of the pin 34 to the large radial surface of a shoulder 52 of a truncated spherical steel ball 54. The ball 54 is in turn transmits the force to its mating socket 56, which is fixed to the tongue 18, to complete the axial load transmission.

Considering the ball 54 and the socket 56 in greater detail, the ball 54 is centrally cylindrically apertured to receive the shank 36 of the pin 34 therethrough, close fitting but preferably rotatable about the pin. The axis of the pin 34 thus defines the axis of the ball 54. The diameter of the shank 36 is substantially greater than the radius of the ball 54. Thus there is no spherical bearing surface at either axial end of the ball 54. The ball 54 is nonsymmetrically truncated perpendicular its axis at its axial ends. The truncated ends are defined by the plane of the shoulder 52 at one end and a parallel plane at the opposite or small end 58. The centroid of the spherical surface of the ball 54 is substantially closer to the shoulder 52 than to the small end 58. The outside diameter of the shoulder 52 is substantially greater than the outside diameter of the small end 58 since the shoulder 52 is adjacent the maximum diameter of the ball 54. Thus the shoulder 52 has a surface area of approximately the maximum possible cross-sectional surface of the ball 54. This provides the largest possible surface area for contact with the collar 50.

Suitable exemplary dimensions for the ball 50 are an external spherical diameter of 4.3 inches, an internal aperture diameter of 3 inches, an axial length between the truncated ends of 2 5/16 inches, and a distance between the centroid and the plane of the shoulder 52 of only .85 inch.

The effective axial thrust transmitting or load bearing area of the ball 54 is greatly increased in one direction over a concentric or symmetrically truncated ball since the axial load bearing area extends from the centroid to the small end 58 of the ball 54. Further, a greatly increased area of the socket 56 bears against the ball 54 in a direction more nearly parallel the thrust axis, i.e. underlying the ball. This greatly reduces the per unit area pressure between the ball and socket for the same axial load. There is a substantial decrease in the wedging effect of the large radial force component produced by the axial load. This is a function of the angle 60 shown in FIGURE 4 between the tangent of the bearing surfaces and the ball axis. The average angle 60 for the ball 54 is substantially increased, therefore substantially reducing the wedging effect. This results in higher load capabilities through reduced material stresses, reduced friction, and a reduced likelihood of bearing seizures. The axial load capacity is greatly increased over a conventional spherical bearing of the same dimensions.

Preferably the socket 56 is a unitary annular member that is neither split nor grooved. The absence of a fractual line or groove in the socket 56 eliminates any wear or scoring caused thereby. The ball 54 may be assembled into the socket 56 without separating or opening the socket 56 since, corresponding to the ball 54, the maximum diameter of the socket 56 is adjacent one of its ends rather than centrally located. Accordingly, the socket 56 is preferably adapted for the ball 54 to slip directly therein. The assembly may be assisted by rotating the ball 54 at right angles to its normal axis, i.e. at right angles to the axis of the socket 56, and by inserting the ball 54 while squeezing the socket 56 slightly to provide a slight expansion in the socket. The socket 56 is itself preferably readily insertable in, and removable from, the tongue 18, being press-fitted into a correspondingly dimensioned aperture in the tongue. The shank 36 of the pin 34 may then be inserted through the ball 54. In the transmission of radial loads between the front frame section 12 and the rear frame section 14, the pin 34 preferably transmits radial thrust from the pair of ears 22 through both of its ends. The pin shank 36 near the threaded end 38 engages the sides of a corresponding cylindrical aperture in the ear 22a. The opposite end of the pin 34 at the head 40 makes axial engagement with the sides of the aperture 48 in the lower ear 22b. The axial forces thus transmitted to the pin 34 are in turn transmitted to the surrounding ball 54 which in turn makes a large radial surface contact with its socket 56, thus transmitting axial forces to the tongue 18.

Considering the components of the hinge 30 involved in relative rotational movement or articulation about the axis 16 between the front and rear frame sections, it will be noted that this rotation is of a limited degree and relatively slow velocity. However, it occurs under extremely high radial and axial loads. This plus the above mentioned misalignment problems created a serious problem of wear and damage in the prior hinge arrangements.

The present invention provides two separate preferred rotational bearing surfaces or interfaces for providing free rotation while transmitting the large forces involved. The first rotational interface 62 is provided between the large cylindrical surface of the shank 36 of the pin 34 and its corresponding cylindrical aperture in the ball 54. This provides a very large bearing area defined by the length and inside diameter of the ball 54. Preferably the ball 54 does not normally rotate about the axis of rotation 16 with the pin 34, but rather rotates with the socket 56 and the tongue 18. This is opposite to the conventional practice of having the rotational interface located between the ball and its socket, i.e having the ball rotate with its pin rather than about it.

The second rotational interface 64 is provided between the above described advantageously large area of the shoulder 52 on the ball 54, and the collar 50 which preferably abuts this entire area. As described above, the collar 50 rotates with the pair of ears 22, and the ball 54 preferably rotates with the tongue 18. It will be recalled that a greatly increased area of active thrust surface, with a consequent much wider distribution of the axial loads, is provided.

Considering the relative movement between the ball 54 and the socket 56, this movement is preferably only for the correction of misalignment in the hinge 30. However, it will be noted that there is a safety back-up for both rotational interfaces 62 and 64 in that the ball 54 and the socket 56 are also capable of relative coaxial rotation although this is not preferred for normal operation. The movements to automatically compensate for misalignment are provided by limited noncoaxial movement between the ball 54 and the socket 56. It may be seen that, where for example the tongue 18 tilts with respect to the ears 22, the socket 56 will move accordingly, thus changing the axis of the socket 56 with respect to the axis of the ball 54 since the ball 54 is fixed coaxially the pin 34. This relative movement is allowed by substantial clearances provided between the tongue 18 and all components associated with the pair of ears 22. The ball shoulder 52 is spaced above the socket 56. This movement maintains an automatic alignment (coplanar abutment) at the second rotational interface 64.

It is important in the operation of the hinge 30 that the first and second rotational interfaces 62 and 64 be adequately lubricated. A suitable lubrication system is provided by means of a lubrication passageway 66 extending centrally axial through the head 40 of the pin 34. The end of the passageway 66 communicates with a central radial lubrication passageway 68. The opposite ends of the passageway 68 open onto the outer surface of the shank 36 directly adjacent the second rotational interface 64 and thereby provide its lubrication. Both ends of the passageway 68 also open into elongate axial lubrication grooves or flutes 70 on the surface of the shank 36. The grooves 70 are generally coextensive with the ball 54 and thereby provide full lubrication for the first rotational interface 62.

Lubrication for the interface between the ball 54 and the socket 56 may be provided by lubrication passageways 72 through the socket 56, which communicate with an annular groove 74 in the surface of the ball 54.

Figure 5:
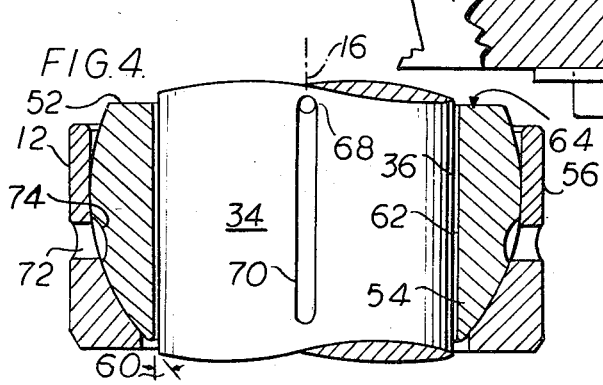
FIGURE 5 is a view taken along the line 5—5 of FIGURE 2.
Figure 4:
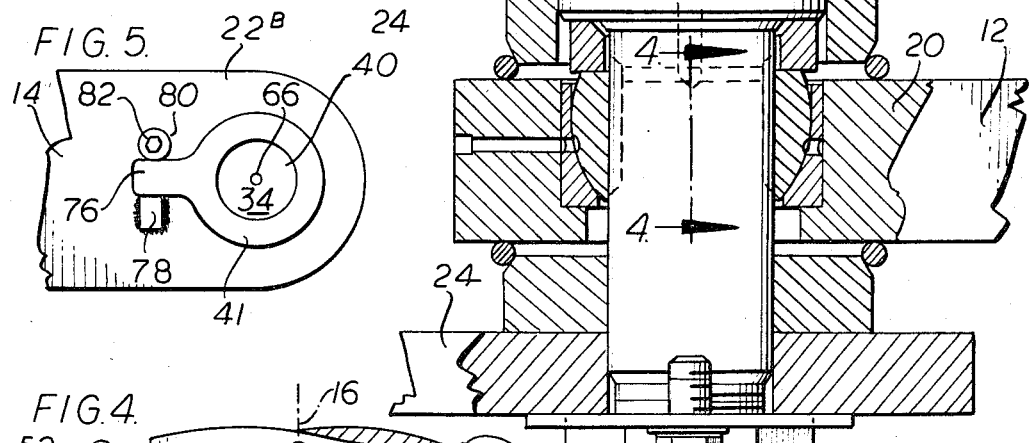
FIGURE 4 is a segmental cross-sectional view taken along the line 4—4 of FIGURE 2.

A further feature of the invention is the structure shown particularly in FIGURE 5 for preventing the pin 34 from rotating relative to the pair of ears 22 and thereby preventing wear therebetween. It may be seen that the pin lockplate 41 is welded to the outer end of the head 40 of the pin 34. It includes, extending radially from the pin 40 along the outer surface of the lower ear 22b, an elongate integral lever arm 76. The ear 22b preferably has an integral projecting lug 78 positioned to abut one side of the outer end of the lever arm 76. There is preferably provided an adjustable locking cam 80 positioned at the opposite side of the end of the lever arm 76. The cam 80 may comprise a thick washer-like member mounted eccentrically on a bolt 82 therethrough. Tightening of the bolt 82 into the ear 22b causes rotation of the eccentric cam 80 and firmly wedges the end of the lever arm 76 between the outer surface of the cam 80 and the lug 78. Thus, the lever arm 76 is firmly locked against any movement relative to the ears 22. Aided by the lever advantage provided by the lever arm 76, complete immobility of the pin 34 is maintained.

It may be seen that there has been provided an articulated vehicle having a greatly improved and more reliable articulation connection. It is contemplated that further variations and modifications within the purview of those skilled in the art can be made herein, and it is intended to cover in the appended claims all such variations and modifications as fall within the true spirit and scope of the invention.

What is claimed is:
1. An articulated material handling vehicle comprising:
 a first frame section and a separate second frame section,
 a plurality of spaced hinges connecting said first and second frame sections to one another and providing relative rotation of said first and second frame sections about a common axis of rotation,
 one of said hinges providing an axial load connection in one axial direction between said first and second frame sections and another of said hinges providing an axial load connection in the opposite axial direction between said first and second frame sections,
 each said hinge including a ball, a pin secured to said first frame section and extending through said ball, and a corresponding mating socket for said ball secured to said second frame section,
 said ball being unsymmetrically truncated to provide a substantially greater load transference capacity between said ball and said socket in one axial direction than in the opposite axial direction,
 and said pin and said ball having a rotational bearing interface providing relative rotation therebetween.

2. The articulated vehicle of claim 1 wherein said ball is spherical and has opposing first and second truncated ends, said first end being substantially closer to the centroid of said ball and having a substantially larger diameter than said second end.

3. The articulated vehicle of claim 2 wherein said first end of said ball has a radial bearing surface having a radial surface area approximately equal to the maximum radial cross-sectional surface area of said ball, and each said hinge further includes means connecting said radial bearing surface to said pin for axial loads.

4. The articulated vehicle of claim 3 wherein said ball normally axially rotates with said socket, said bearing interface between said pin and said ball is cylindrical, and said means connecting said radial bearing surface on said ball to said pin is an annular bearing ring secured to said pin and fully abutting said radial bearing surface.

5. The articulated vehicle of claim 4 wherein said annular bearing ring and said radial bearing surface define a rotational bearing interface for relative rotation and axial load transmission between said annular bearing ring and said ball.

6. The articulated vehicle of claim 5 further including means for lubricating said bearing interface between said pin and said ball and said bearing interface between said annular bearing ring and said ball.

7. The articulated vehicle of claim 1 further including pin locking means, said pin locking means including a lever arm secured to and extending radially from said pin, and a movable locking member on said first frame section having a cam surface engaging said lever arm at a substantial distance from said pin to prevent said pin from rotating with respect to said first frame section.

References Cited
UNITED STATES PATENTS

| | | | |
|---|---|---|---|
| 2,913,223 | 11/1959 | LeTourneau | 180—51 X |
| 3,134,628 | 5/1964 | Lackey | 180—79.2 X |
| 3,167,147 | 1/1965 | Symons et al. | 180—51 |
| 3,253,671 | 5/1966 | Fielding | 180—51 |

LEO FRIAGLIA, *Primary Examiner.*